United States Patent

[11] 3,617,270

| [72] | Inventors | Helmut Kampfer<br>Cologne-Stammheim, Germany;<br>Karel Eugeen Verhille, Mortsel, Belgium |
| --- | --- | --- |
| [21] | Appl. No. | 833,668 |
| [22] | Filed | June 16, 1969 |
| [45] | Patented | Nov. 2, 1971 |
| [73] | Assignee | Agfa-Gevaert Aktiengesellschaft<br>Leverkusen, Germany |
| [32] | Priority | June 20, 1968 |
| [33] | | Germany |
| [31] | | P 17 72 688.4 |

[54] SENSITIZATION OF AN INORGANIC PHOTOCONDUCTIVE LAYER WITH 1, 3- AND 1, 2-SQUARIO ACID METHINE DYES
2 Claims, No Drawings

[52] U.S. Cl. .................................................. 96/1.7,
96/1.8, 260/257, 260/260, 260/310, 260/296,
260/240 R

[51] Int. Cl. .................................................. G03g 5/00,
G03g 7/00
[50] Field of Search .................................. 96/1.7, 1.6,
1.5

[56] References Cited
UNITED STATES PATENTS

| 3,125,447 | 3/1964 | Stewart ......................... | 96/1.7 X |
| --- | --- | --- | --- |
| 3,128,179 | 4/1964 | Kendall et al. ................ | 96/1.7 X |
| 3,250,615 | 5/1966 | Van Allan et al. ............. | 96/1.7 X |

*Primary Examiner*—George F. Lesmes
*Assistant Examiner*—John R. Miller
*Attorney*—Connolly and Hutz

ABSTRACT: Electrophotographic material comprising a support layer and a photoconductive layer, the latter comprising an inorganic photoconductor in a film-forming binder. The photoconductor is sensitized by 1, 3- or 1, 2-quadratic acid methine dyes.

SENSITIZATION OF AN INORGANIC PHOTOCONDUCTIVE LAYER WITH 1,3- AND 1,2- SQUARIO ACID METHINE DYES

This invention relates to the optical sensitization of the photoconductive materials, which preferably contain zinc oxide as photoconductor, with squaric acid derivatives.

It is already known that photoconductive layers whose characteristic sensitivity usually lies in the ultraviolet region of the spectrum may be sensitized to visible light by the addition of dyes which transmit radiant energy. The dyes which have been proposed for this purpose belong to all sorts of different classes of compounds, e.g. triphenyl methane dyes, phenolsulfonphthaleins, xanthene and acridine dyes, as well as polymethine dyes, i.e. cyanines, merocyanines and oxonoles.

The known dyes have, however, the disadvantage that they either insufficiently increase the sensitivity or cause too much coloration of the electrophotographic layer. However, as a rule only colorless or almost colorless layers can be used. The disadvantage of coloration is especially serious in the case of photoconductive materials because the sensitizing dyes used are generally not washed out by the usual processing methods or destroyed by baths. Bleaching of the sensitizing dyes after production of the image is a complicated process and is not economically feasible.

It is therefore an object of the invention to provide optically sensitized photoconductive layers which preferably contain zinc oxide as photoconductor, which are substantially colorless and the sensitivity of which is unchanged as a result of storage.

Sensitized electrophotographic layers, preferably zinc oxide layers, which contain 1,3- or 1,2-squaric acid methine dyes of the following formulas have now been found to be suitable for this purpose:

I 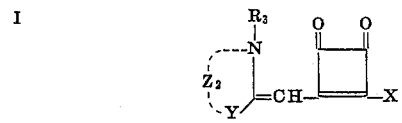

II 

in which X, $X_1$ and $X_2$ have the following meanings, respectively:

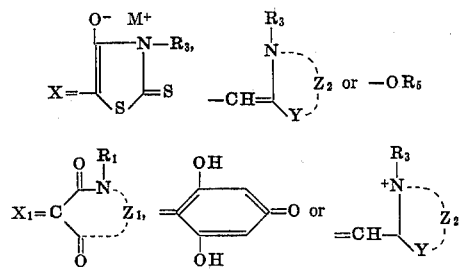

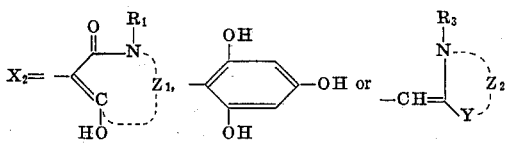

$R_1$ represents a hydrogen atom, a saturated or an unsaturated aliphatic group having preferably up to five carbon atoms, for example, methyl, ethyl, butyl or allyl, or an aryl group, preferably a phenyl group in which the phenyl ring may carry further substituents such as alkyl or alkoxy with preferably up to three carbon atoms, halogen such as chlorine or bromine, carboxyl or esterified carboxyl;

$Z_1$ represents

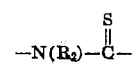

to complete a thiobarbituric acid ring or $-N(R_4)$ $R_2$ represents a hydrogen atom, a saturated or an unsaturated aliphatic group having preferably up to five carbon atoms, for example, methyl, ethyl, butyl or allyl or aryl, preferably phenyl, in which the phenyl ring may contain further substituents, for example alkyl or alkoxy with preferably up to three carbon atoms, halogen such as chlorine or bromine, carboxyl or esterified carboxyl;

$R_3$ represents a saturated or unsaturated aliphatic group having preferably up to four carbon atoms, for example ethyl or allyl, which groups may contain further substituents, especially hydroxyl, carboxyl, sulfo or halogen such as chlorine, or any aryl group, especially phenyl in which the phenyl ring may contain further substituents, for example alkyl or alkoxy with preferably up to three carbon atoms, halogen such as chlorine or bromine, nitrile, carboxyl or esterified carboxyl;

$R_4$ represents aryl, especially phenyl, the phenyl ring of which may contain further substituents, for example alkyl or alkoxy with preferably up to three carbon atoms, halogen such as chlorine or bromine, nitrile, carboxyl or esterified carboxyl;

$R_5$ represents a hydrogen atom, an alkyl group with preferably up to five carbon atoms, or any cation, for example an alkali metal cation or an ammonium ion;

Y represents $-S-$, $-Se-$, $-C(CH_3)_2-$, vinylene or $-N(R_3)-$;

$Z_2$ represents the ring members required for completing a heterocyclic group containing a 5- or 6-membered heterocyclic ring, especially a group of the oxazole series, the benzoxazole series, the naphthoxazole series, the thiazole series, the benzothiazole series, the naphthothiazole series, the selenazole series, the benzoselenazole series, the naphthoselenazole series, the thiadiazole series, the quinoline series or the indole series, which above-mentioned heterocyclic rings or the benzene or naphthalene rings fused-on thereto may contain further substituents, for example alkyl or alkoxy groups with preferably up to five carbon atoms, methylenedioxy or halogen such as chlorine or bromine; and M represents any cation or a hydrogen atom; it is not present when $X_1$ in formula II carries a positive charge.

The following compounds have proved to be especially suitable:

| | Absorption (nm.) | Melting point (° C.) |
|---|---|---|
| (1) 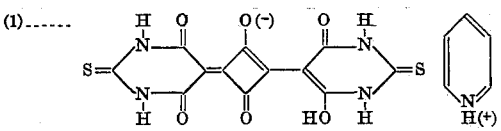 | 533 | (¹) |

| | Absorption (nm.) | Melting point (° C.) |
|---|---|---|
| (2) [structure with C₂H₅, N, S, O, (C₂H₅)₃NH(+)] | 533 | 250–252 |
| (3) [structure with CH₃, N, S, O, CH₂CH=CH₂, pyridinium] | 533 | 279–281 |
| (4) [structure with C₆H₅–N, pyridinium H(+)] | -------------- | 275–277 |
| (5) [benzothiazole structure with CH₃, N-C₂H₅, ONa, S·H₂O] | 542 | (¹) |
| (6) [bis-benzothiazole structure with CH₃] | 521 | 340–345 |
| (7) [bis-benzoselenazole structure with C₂H₅] | 530 | 295–296 |
| (8) [thiadiazole structure with CH₃, C₆H₅, N(CH₃)–CHO] | 540 | 312–315 |
| (9) [bis-quinoline structure with CH₃] | 605+562 | 330–333 |
| (10) [structure with OH, O] | Angew. Chemie 77, 681 (1965) | |
| (11) [benzothiazole with C₂H₅, OC₄H₉] | 438 | 150–252 |
| (12) [thiadiazole with C₂H₅, C₆H₅, OC₂H₅] | 456 | 186–189 |
| (13) [quinoline with CH₃, OC₂H₅] | 493 | 214–218 |

| | Absorption (nm.) | Melting point (° C.) |
|---|---|---|
| (14) [structure] | 446 | 266–270 |
| (15) [structure] | 448 | 247–249 |
| (16) [structure] | — | 211–213 |
| (17) [structure] | 425 | 204–207 |
| (18) [structure] | 445 | >360 |
| (19) [structure] | Angew. Chemie 79, 581 (1967). | |
| (20) [structure] | 665 | 269–272 |
| (21) [structure] | 690 | >360 |
| (22) [structure] | 655 | 292–299 |
| (23) [structure] | 650 | 244–246 |

| | | Absorption (nm.) | Melting point (° C.) |
|---|---|---|---|
| (24) | [structure] | | Angew. Chemie 79, 581 (1967) |
| (25) | [structure] | | Angew. Chemie 79, 581 (1967) |
| (26) | [structure] | 650 | 279–281 |

[1] Decomposes.

The above compounds are prepared by known processes. Regarding the tetra and pentamethine dyes derived from 1,2- or 1,3-squaric acid it is referred to the publication in Ang. Chem. 79, 581 (1967). The preparation of dye 10 is described in Ang. Cem. 77,681 (1965). The anionic cyclotrimethine dyes, for example the compounds 1 to 4, are prepared by the reaction of the corresponding thiobarbituric acid or of the pyrazolidinedione with squaric acid in butanol in the presence of a base, such as pyridine or triethylamine or with squaric acid diethyl ester in alcohol, with heating.

The preparation of compound 2 is described in detail below.

Compound 2

1.8 g. of 1-ethyl-2-thiobarbituric acid are dissolved with 0.6 g. of squaric acid in 50 ml. of boiling butanol, and boiled for 10 minutes, after the addition of 3 ml. of pyridine. The precipitated dye is converted into the triethylammonium salt by addition of methanol/triethylamine.
Yield: 1.1 g., m.p. 250–252° C.

The monosubstituted squaric acid dyes, for example compounds 11 to 17, are prepared by briefly heating heterocyclic 2-methyl quaternary salts with the corresponding squaric acid esters in a suitable solvent such as alcohol in the presence of triethylamine, and they can be saponified into their dye acids or the salts thereof. The preparation of compounds 14 and 18 is described in detail below.

Compound 14

5 g. of 2,3,5,6-tetramethylbenzothiazolium methyl sulfate are added to a hot solution of 1.7 g. of squaric acid diethylester and 2.5 ml. of triethylamine in 25 ml. ethanol. The yellow dye precipitates immediately and is recrystallized from chloroform/methanol.
Yield: 1.6 g., m.p. 266–270° C.

Compound 18

5.8 g. of 1-[3-methylbenzothiazolinylidene-(2)-methyl]-2-ethoxycyclobutene-3,4-dione (m.p. 220–223° C.) prepared in a manner analogous to compound 14 are heated to boiling in 150 ml. of ethanol, and 2.5 ml. of 40 percent NaOH followed by 40 ml. of H$_2$O are then added. The dye crystallizes on cooling and can be recrystallized from ethanol and H$_2$O in the ratio of 3:1
Yield: 3.8 g., m.p. >360° C.

The sensitizing effect of the squaric acid derivatives in photoconductive layers, especially those which contain zinc oxide as photoconductive substance, is extremely various. The photoconductive layers can be sensitized to the blue, green or red region of the visible spectrum according to the dye used. Thus, for example, compounds 11 to 18 sensitize for the blue spectral region, compounds 1 to 9 for the green and compounds 19 to 26 for the red spectral region. The squaric and derivatives impart a high sensitivity to the photoconductive layers and in contrast to many known sensitizing dyes, for example, azo dyes or dyes from the triphenylmethane series, they produce little or no coloration.

Owing to their selective red sensitization above 600 m$\mu$, the dyes, especially those of formulas 19 to 26, are especially advantageous for use in those photoconductive layers which are used for the production of color images. The dyes which increase the sensitivity in the blue spectral region are suitable for use in photoconductive materials which are to be used as office copying paper.

The squaric acid sensitizers are added to the layers in such quantities that the layers contain about 0.1 to 20 mg. of sensitizer per $m^2$ of finished photoconductive layer. The electrophotographic layers are produced by triturating the photoconductive substance with the solution of sensitizing dye in a suitable solvent, for example methyl alcohol or ethyl alcohol or dimethylformamide, and letting the solvent evaporate. The sensitizing dye precipitates on the grain surface of the photoconductive substance which is now worked up in known manner with a dilute layer binding agent to produce the photoconductive layer. The dyes according to the invention can also be used equally successfully in other sensitizing methods. In one of these processes, the solution of sensitizing dye in a solvent which is inert to the binder is added to the mixture of photoconductor and binder before dispersion. Another method, which has the advantage of yielding electrophotographic layers with little coloration is the sensitizing process described in British Pat. Specification No. 919,684. Finally, a finished, nonsensitized photoconductive layer can be sensitized by subsequent immersion in the solution of sensitizing dye followed by drying. The squaric acid sensitizers are especially suitable for sensitizing photoconductive layers with binders of the type which are worked up from aqueous solutions.

Furthermore, the use of the dyes according to the invention is not limited to any particular binders. In principle, any of the film forming agents customarily used in electrophotography may be used as binders for the present process, for example silicone resins, alkyl resins, polyurethanes, polyvinyl acetate, copolymers of vinyl acetate, e.g. with crotonic acid, copolymers which contain maleic acid, formaldehyde resins, e.g. maleic formaldehyde resin, or mixtures of such binders.

The photoconductive substances used are preferably inorganic pigments such as $TiO_2$ or $As_2O_3$, and, in particular, zinc oxide.

The photoconductive materials according to the invention may be used in any electrophotographic processes, for example in development processes which use a solid, pulverulent toner powder, aerosol development processes, electrophoretic processes and so-called wetting development processes. The materials according to the invention may be used in both processes for producing electrostatic charge images and in processes for producing conductivity images.

Example

Preparation of the photoconductive layer:

20 g. of conductive zinc oxide, 25 ml. of water and 1 ml. of a 10 percent solution of a copolymer of maleic acid anhydride and N-vinylpyrrolidone (proportion by weight 52:48) in a mixture of concentrated aqueous ammonia and water (1:9) were mixed for 10 minutes, using a high speed stirrer. The dispersion was then added to a solution of 2 g. of a copolymer of vinyl acetate and crotonic acid (proportion by weight 95:5) and 1.25 ml. of an 80 percent aqueous solution of a partially etherified melamine formaldehyde resin in 25 ml. of water and 1 ml. of a concentrated aqueous ammonia solution (25 percent by weight). The casting dispersion was divided into several parts, one of the sensitizing dyes indicated in the following table was added in the form of a 0.1 percent solution and in a quantity of 0.5 mg./g. of zinc oxide. The samples were then cast on a layer support of baryta paper and dried. The finished layers contained 25 g. of zinc oxide per $m^2$.

The layers were charged by means of a conventional Corona discharge apparatus and exposed for 15 seconds to radiation of an intensity of 2280 Lux through a step wedge of constant 0.1, using a 450-Watt incandescent lamp.

The exposed samples were developed electrophoretically. The sensitivity of the resulting recording layers was expressed as the number of steps which correspond to the discharged areas on which no developer particles were deposited. The higher this number, the more sensitive is the layer.

TABLE

| Sensitizer | General sensitivity | Maximum sensitivity region (m/μ) |
|---|---|---|
|  | 12 | <380 |
| 11 | 15 | 440 |
| 12 | 14 | 460 |
| 13 | 16 | 470–495 |
| 14 | 14 | 445 |
| 15 | 13 | 450 |
| 16 | 13 | 445 |
| 18 | 15 | 465 |
| 19 | 24 | 670 |
| 20 | 21 | 685 |
| 2 | 20 | 510–550 |
| 1 | 23 | 550 |
| 3 | 14 | 545 |
| 6 | 22 | 490–520 |
| 7 | 22 | 490–525 |
| 8 | 17 | 550 |
| 9 | 19 | 560–605 |
| 5 | 20 | 450–510–545 |

Patent claims:

1. Light sensitive electrophotographic material comprising a support layer and a photoconductive layer comprising an inorganic photoconductor in a film-forming binder, the photoconductive layer also containing a sensitizing dye of one of the following formulas:

I 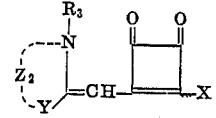

II 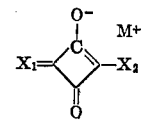

in which X, $X_1$ and $X_2$ have the following meaning, respectively:

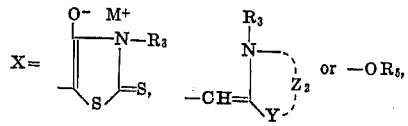

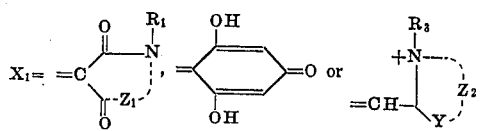

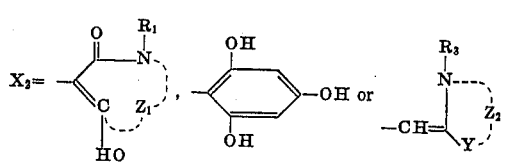

$R_1$ represents a hydrogen atom, a saturated or unsaturated aliphatic group or an aryl group;

$Z_1$ represents

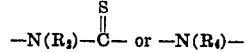

$R_2$ represents a hydrogen atom, a saturated or an unsaturated aliphatic group or an aryl group;

$R_3$ represents a saturated or an unsaturated aliphatic group or an aryl group;

$R_4$ represents an aryl group;

$R_5$ represents a hydrogen atom, an alkyl group or any cation;

Y represents $-S-$, $-Se-$, $-C(CH_3)_2-$, vinylene or $-N(R_3)-$;

$Z_2$ represents the ring members required for completing a heterocyclic group containing a 5-membered or 6-membered heterocyclic ring; and M represents a hydrogen atom or any cation; it is not present in formula II when $X_1$ carries a positive charge.

2. Light sensitive electrophotographic material according to claim 1, characterized in that the photoconductive layer contains, as photoconductor, zinc oxide dispersed in a film-forming binder.

* * * * *

UNITED STATES PATENT OFFICE
CERTIFICATE OF CORRECTION

Patent No. 3,617,270　　　　　　　　Dated November 2, 1971

Inventor(s) Helmut Kampfer et al

It is certified that error appears in the above-identified patent and that said Letters Patent are hereby corrected as shown below:

On the front page, in the title, "squario" should read -- squaric -- ; On the front page, in the Abstract, line 4, "quadratic" should read -- squaric -- .
Column 1, the formula at line 55 should read:

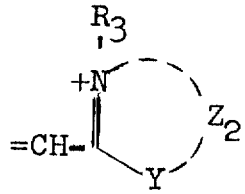

Column 3, formula 10 should read as follows:

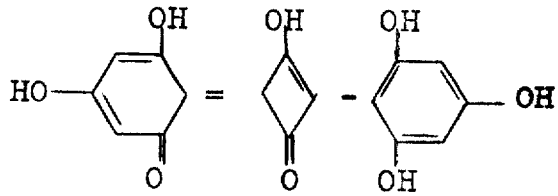

Column 3, formula 13 should read as follows:

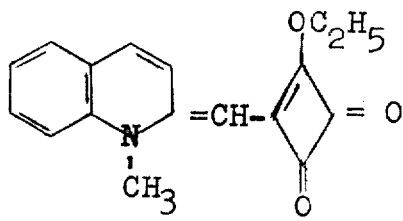

CERTIFICATE OF CORRECTION

Patent No. 3,617,270　　　　　　　　　Dated  November 2, 1971

Inventors  Helmut Kampfer et al　　　　　　PAGE - 2

---

Column 5, formula 16 should read as follows:

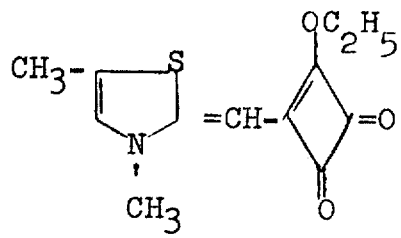

Column 7, formula 26 should read as follows:

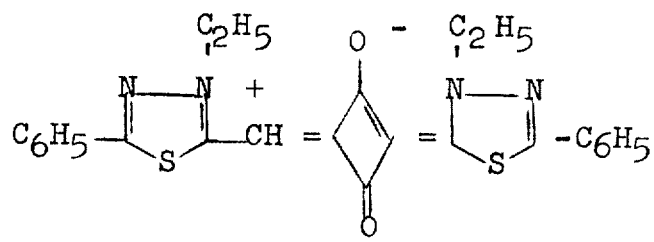

Column 8, line 33, "squaric and" should read -- squaric acid -- .

Column 10, the formula at line 36 should read as follows:

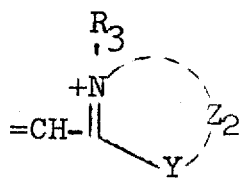

Signed and sealed this 31st day of October 1972.

(SEAL)
Attest:

EDWARD M.FLETCHER,JR.　　　　　　　　ROBERT GOTTSCHALK
Attesting Officer　　　　　　　　　　　Commissioner of Patents